(12) United States Patent
Li et al.

(10) Patent No.: US 11,020,702 B2
(45) Date of Patent: Jun. 1, 2021

(54) SIMULTANEOUS REACTION SYSTEM AND METHOD FOR ORGANIC MATERIAL PYROLYSIS AND COMBUSTION

(71) Applicant: DALIAN UNIVERSITY OF TECHNOLOGY, Dalian (CN)

(72) Inventors: Aimin Li, Dalian (CN); Xin Wang, Dalian (CN); Lei Zhang, Dalian (CN)

(73) Assignee: DALIAN UNIVERSITY OF TECHNOLOGY, Liaoning (CN)

(*) Notice: Subject to any disclaimer, the term of this patent is extended or adjusted under 35 U.S.C. 154(b) by 476 days.

(21) Appl. No.: 16/076,520

(22) PCT Filed: Aug. 28, 2017

(86) PCT No.: PCT/CN2017/099361
§ 371 (c)(1),
(2) Date: Aug. 8, 2018

(87) PCT Pub. No.: WO2018/107805
PCT Pub. Date: Jun. 21, 2018

(65) Prior Publication Data
US 2019/0039010 A1 Feb. 7, 2019

(30) Foreign Application Priority Data
Dec. 12, 2016 (CN) .......................... 201611138345.9

(51) Int. Cl.
*B01D 53/00* (2006.01)
*B01D 53/50* (2006.01)
(Continued)

(52) U.S. Cl.
CPC .......... *B01D 53/002* (2013.01); *B01D 53/50* (2013.01); *B01D 53/75* (2013.01); *B01D 53/78* (2013.01); *F23B 90/06* (2013.01); *F23J 15/02* (2013.01); *F23J 15/022* (2013.01); *F23K 1/00* (2013.01); *F23K 1/02* (2013.01); *F23K 3/02* (2013.01); *F23K 3/16* (2013.01); *B01D 2257/702* (2013.01); *B01D 2258/0283* (2013.01); *F23K 2203/20* (2013.01); *F23K 2203/202* (2013.01); *F23K 2203/203* (2013.01)

(58) Field of Classification Search
CPC ...... F23J 15/022; F23J 15/02; F23K 2203/20; F23K 3/00; F23K 3/16; F23K 1/00; F23K 1/02; F23K 3/02; F23K 2203/203; F23K 2203/202; B01D 2258/0283; B01D 53/75; B01D 53/50; B01D 53/78; B01D 2257/702; F23B 90/06
See application file for complete search history.

(56) References Cited

FOREIGN PATENT DOCUMENTS

| CN | 201459031 U | * | 5/2010 |
| CN | 201459031 U | | 5/2010 |

(Continued)

*Primary Examiner* — Randy Boyer
*Assistant Examiner* — Juan C Valencia
(74) *Attorney, Agent, or Firm* — Muncy, Geissler, Olds & Lowe, P.C.

(57) ABSTRACT

A simultaneous reaction system and method for organic material pyrolysis and combustion. The system comprises a time sharing reactor for pyrolysis and combustion, a feeder, a recovery apparatus for pyrolysis volatility products and a flue gas purifier. The whole process mainly consists of two time sharing stages of pyrolysis and combustion. The system has the advantages of cascade utilization of energy, short time of pyrolysis reaction and high efficiency of heat transfer.

10 Claims, 3 Drawing Sheets

(51) Int. Cl.
*B01D 53/78* (2006.01)
*F23B 90/06* (2011.01)
*F23K 1/02* (2006.01)
*F23K 3/02* (2006.01)
*F23J 15/02* (2006.01)
*F23K 3/16* (2006.01)
*F23K 1/00* (2006.01)
*B01D 53/75* (2006.01)

(56) References Cited

FOREIGN PATENT DOCUMENTS

| | | | | | |
|---|---|---|---|---|---|
| CN | 102537973 | A | * | 7/2012 | |
| CN | 102537973 | A | | 7/2012 | |
| CN | 203212526 | U | * | 9/2013 | |
| CN | 203212526 | U | | 9/2013 | |
| CN | 203764635 | U | * | 8/2014 | |
| CN | 203764635 | U | | 8/2014 | |
| CN | 104100978 | A | * | 10/2014 | |
| CN | 104100978 | A | | 10/2014 | |
| CN | 204529743 | U | * | 8/2015 | |
| CN | 204529743 | U | | 8/2015 | |
| CN | 205664385 | U | * | 10/2016 | |
| CN | 205664385 | U | | 10/2016 | |
| CN | 106642081 | A | * | 5/2017 | .............. F23J 15/02 |
| CN | 106642081 | A | | 5/2017 | |
| JP | 09137927 | A | * | 5/1997 | |
| JP | 09137927 | A | | 5/1997 | |
| JP | 2006023024 | A | | 1/2006 | |
| JP | 2006023024 | A | * | 1/2006 | |

* cited by examiner

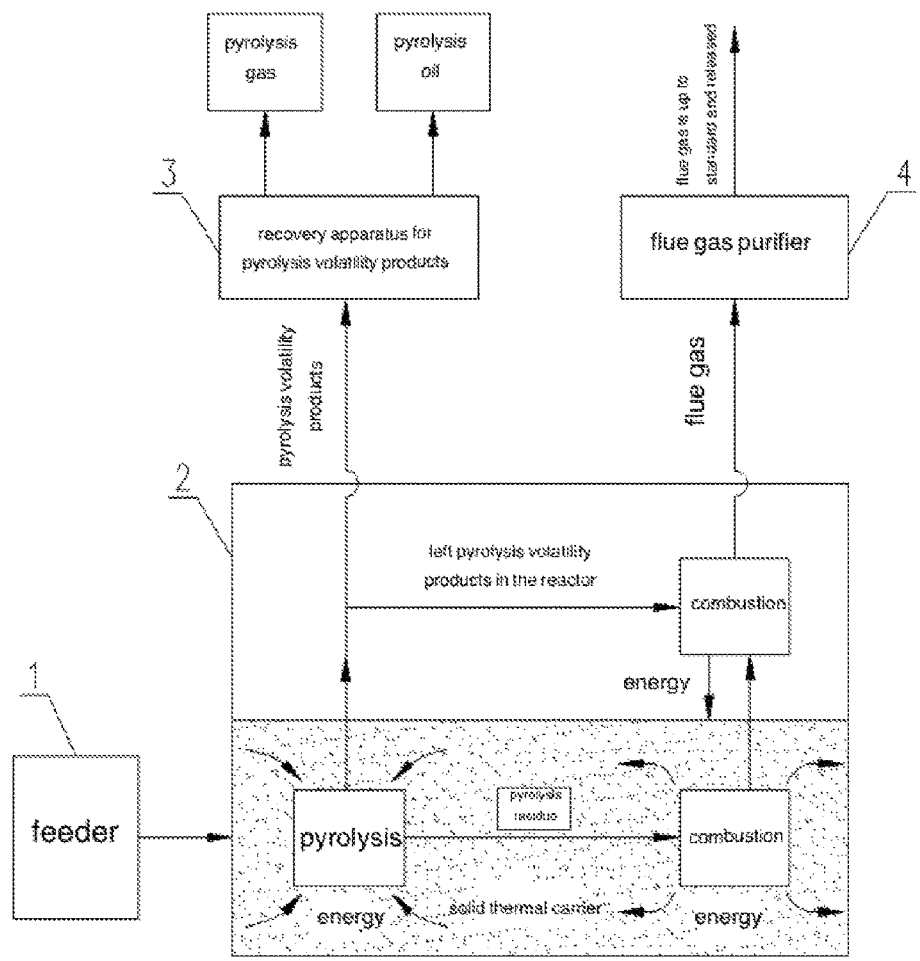
FIG. 1 (FIG. 1 as an illustration in Abstract)
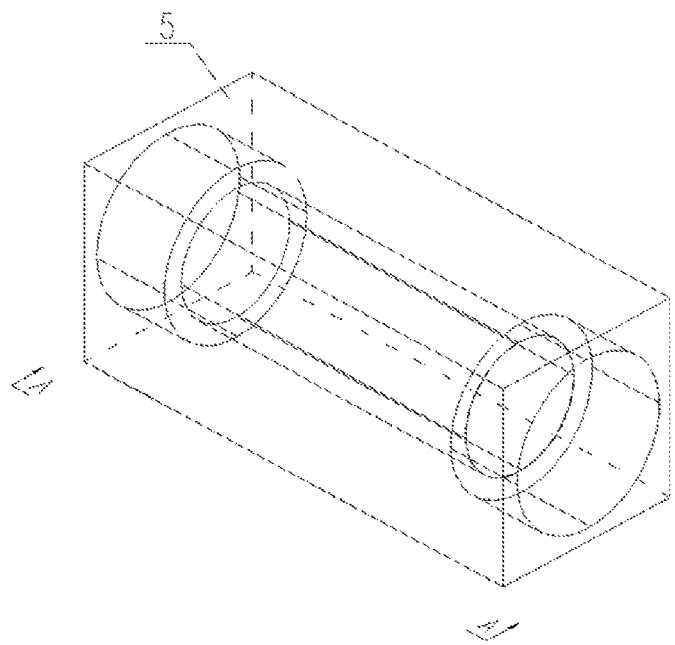
FIG. 2

SIMULTANEOUS REACTION SYSTEM AND METHOD FOR ORGANIC MATERIAL PYROLYSIS AND COMBUSTION

TECHNICAL FIELD

The present invention relates to a self-powered time sharing reaction system and method for organic materials pyrolysis and combustion, and it belongs to the field of organic materials resource reutilization and environmental technology, distinctive for both near zero release of the organic materials in the time sharing process of organic materials pyrolysis and combustion and the recycling of the resource contained.

BACKGROUND

Low-rank coal accounts for a large proportion of the world coal resource. It is characterized by relatively high content of gelatinized components in low-rank coal components, high volatility in the industrial analysis components and more side chains in the organic structure. On the one hand these characteristics lead to low efficiency of direct combustion or gasification; on the other hand, these characteristics may result in high chemical reactivity of the low rank coal and make the low rank coal easily effloresce and crush in air, which makes it unsuitable for long-distance transportation and long-term storage. Therefore, local treatment, upgrading and changing its quality are key points of low-rank coal utilization.

With the development of industrial production and the improvement of people's living standard, an increasingly large amount of organic waste has been produced, including scrap tires, domestic waste and oily sludge. Harmless treatment of organic waste is difficult and costly, and usual treatment methods can cause environmental pollution. What's more, the recycling of organic waste is of great value, especially in the face of worldwide energy depletion, it becomes more meaningful.

SUMMARY

The present invention provides a self-powered time sharing reaction system and method for organic materials pyrolysis and combustion. Through adjusting the overall structure of the system, the pyrolysis and combustion are carried out in the same time sharing reactor, which realizes near zero release of organic materials and the recycling the energy contained at the same time. Based on the distributed characteristics of some organic materials, such as low-rank coal and organic waste, the movable and integrated system which is compact in structure is utilized to minimize its volume and make it easier to be quickly transferred from one resource point to another resource point when the treatment is finished.

The technical scheme of the invention:

A self-powered time sharing reaction system for organic materials pyrolysis and combustion comprises a feeder 1, a time sharing reactor for pyrolysis and combustion 2, a recovery apparatus for pyrolysis volatility products 3 and a flue gas purifier 4.

The feeder 1 comprises a low viscosity organic materials feeder 7 and a high viscosity organic materials feeder 8.

The low viscosity organic materials feeder 7 comprises a sealed valve A18, a sealed valve B19, a low viscosity organic materials bin 20, a shredder 21 and a screw feeder 22. The sealed valve A18 is set at the inlet of the low viscosity organic materials bin 20 and the materials outlet of the low viscosity organic materials bin 20 connects with the inlet of the shredder 21 through the sealed valve B19. The outlet of the shredder 21 connects with the inlet of the screw feeder 22. The outlet of the screw feeder 22 leads to the time sharing reactor for pyrolysis and combustion 2. The low viscosity organic materials pass sequentially through the low viscosity organic materials bin 20, the shredder 21 and the screw feeder 22 and finally enter the time sharing reactor for pyrolysis and combustion 2.

The high viscosity organic materials feeder 8 comprises a sealed valve C23, a high viscosity organic materials bin 24, a water jacket 25, a push-type injection feeder 26 and a gas-lock device 27. The sealed valve C23 is set on the top of the high viscosity organic materials bin 24, and the outlet of the high viscosity organic materials bin 24 connects with the materials inlet of the time sharing reactor for pyrolysis and combustion 2 through the gas-lock device 27. The push-type injection feeder 26 is set at the bottom of the high viscosity organic materials bin 24 and in front of the gas-lock device 27, and it is used to jet the high viscosity organic materials into the time sharing reactor for pyrolysis and combustion 2, which prevents the high viscosity organic materials in the time sharing reactor for pyrolysis and combustion 2 from accumulating. The water jacket 25, 30-50 mm thick, is set outside the high viscosity organic materials bin 24.

There are two time sharing reaction stages of pyrolysis and combustion in the time sharing reactor for pyrolysis and combustion 2. The time sharing reactor for pyrolysis and combustion 2 comprises a solid thermal carrier 29. The solid thermal carrier 29 comprises an inner air duct 30 inside and an exterior air duct 31 outside, and both the inner air duct 30 and the exterior air duct 31 have holes or wind caps. The inner air duct 30 is used to provide air for burning the pyrolysis residue and the exterior air duct 31 is used to provide air for burning the pyrolysis volatility products. If the time sharing reactor for pyrolysis and combustion 2 is in the form of a fluidized bed, the inner air duct 30 is equivalent to an air distributor.

The recovery apparatus for pyrolysis volatility products 3 comprises a condenser A12, a recovery apparatus for pyrolysis oil 13 and a recovery apparatus for pyrolysis gas 14. A pyrolysis volatility products outlet 35 of the time sharing reactor for pyrolysis and combustion 2 connects with a pyrolysis volatility products inlet 39 of the condenser A12, and the condenser A12 has a heat exchanger A56 inside. The pyrolysis volatility products that enter the condenser A12 exchange heat indirectly with the water in the heat exchanger A56. There is an oil discharge outlet 43 at the bottom of the condenser A12. The oil discharger outlet 43 leads to the recovery apparatus for pyrolysis oil 13 which is set below the condenser A12. The condensed pyrolysis oil passes the oil discharge outlet 43 and enters the recovery apparatus for pyrolysis oil 13 for recovery. The recovery apparatus for pyrolysis gas 14 is set on the left of the condenser A12 and a gas passage is between them. The pyrolysis gas released from the outlet of the condenser A12 enters the recovery apparatus for pyrolysis gas 14 for recovery.

The flue gas purifier 4 comprises a condenser B15, a dust remover 16, a deacidification system 17. The dust remover 16 and the deacidification system 17 are sequentially placed on the right of the condenser B15. A flue gas outlet 36 of the time sharing reactor for pyrolysis and combustion 2 connects with a flue gas inlet 44 of the condenser B15. The condenser B15 has a heat exchanger B57 inside. The flue gas from the time sharing reactor for pyrolysis and combustion 2 exchanges heat indirectly with the steam/water in the heat exchanger B57. A condensed flue gas outlet 45 of the condenser B15 leads to the dust remover 16. A dust-removed flue gas outlet 49 of the dust remover 16 leads to the deacidification system 17. When the processes of dust removal and deacidification bring the quality of the flue gas to the standard, the processed flue is then released directly into air. There is a small ash removal door 54 at the bottom of the condenser B15.

The water jacket 25 of the high viscosity organic materials feeder 8 comprises a high temperature working medium inlet 52 and a cooling water outlet 53. The cooling water outlet 53 connects with a cooling water inlet 41 of the condenser A12. After the indirect heat exchange with the pyrolysis volatility products in the condenser A12, the cooling water becomes hot water. The condenser A12 comprises a hot water outlet 42, and the hot water outlet 42 connects with a hot water inlet 46 of the condenser B15. The heated water enters the condenser B15 to exchange heat indirectly with the flue gas and becomes high-temperature saturated water or steam. The condenser B15 comprises a high temperature working medium outlet 47 which connects with high temperature working medium inlet 52 of the water jacket 25. After the second heat exchange the high-temperature saturated water/steam passes through the duct and the high temperature working medium inlet 52 and enters the water jacket 25. The process is thus repeated. In addition, the condenser A12 also comprises a make-up water inlet 55. If there is water loss during the whole pyrolysis and combustion process, additional water will be fed into the condenser A12 for supplement through the make-up water inlet 55 of the condenser A12.

Said time sharing reactor for pyrolysis and combustion can be in a form of rotary kiln which can realize full mixture of the solid thermal carrier and the organic materials by self-rotation of the rotary kiln; it can also be in a form of fixed bed which can realize full mixture of the solid thermal carrier and the organic materials by adding an agitator; or it can be in a form of fluidized bed which can realize full mixture of the solid thermal carrier and the organic materials by bed fluidization.

The materials of said solid thermal carrier are silica sand, slag, etc.

A plurality of transverse and longitudinal temperature baffles 48 are set inside said condenser B15 to enhance the heat exchange and increase the overall retention time of flue gas at the same time.

Said self-powered time sharing reaction system for organic materials pyrolysis and combustion can be manufactured into a movable type. The time sharing reactor for pyrolysis and combustion and its corollary apparatus are placed in container A5, and the recovery apparatus for pyrolysis volatility products and the flue gas purifier are placed in container B6.

Said dust remover can be a bag type, a ceramic type or an electrostatic type. The dust removal efficiency should be more than 99.9%.

A self-powered time sharing reaction method for organic materials pyrolysis and combustion is characterized by following steps:

(I) Feeding stage: Open the sealed valve A and close the sealed valve B. The low viscosity organic materials are sent into the low viscosity organic materials bin through the sealed valve A on the top of the low viscosity organic materials feeder. When the amount of the low viscosity organic materials reaches a given quantity, close the sealed valve A, open the sealed valve B and operate the shredder. The low viscosity organic materials are crushed into pieces of 1-5 mm, and then sent into the time sharing reactor for pyrolysis and combustion through the screw feeder.

Open the sealed valve C and the high viscosity organic materials are sent into the high viscosity organic materials bin through the sealed valve C. When the amount of the high viscosity organic materials reaches a given quantity, close the sealed valve C. The high viscosity organic materials in the high viscosity organic materials bin are melted by the high-temperature saturated water/steam inside the water jacket and then jetted into the time sharing reactor for pyrolysis and combustion by the push-type injection feeder.

(II) Pyrolysis stage: Close the valve of the flue gas outlet of the time sharing reactor for pyrolysis and combustion, and the organic materials sent into the time sharing reactor for pyrolysis and combustion mix fully and evenly with the solid thermal carrier. The solid thermal carrier rapidly heats the organic materials and the pyrolysis reaction takes place, which produces pyrolysis residue and pyrolysis volatility products. The heavy tar in the pyrolysis volatility products is condensed and absorbed in the reactor, and the pyrolysis residue and a small amount of the pyrolysis volatility products are left in the time sharing reactor for pyrolysis and combustion. Open the pyrolysis volatility products outlet and most of the pyrolysis volatility products are sent into the condenser A of the recovery apparatus for pyrolysis volatility products. The pyrolysis volatility products exchanges heat indirectly with the condensed water in the condenser A. The pyrolysis oil in the pyrolysis volatility products is condensed and liquefied into droplets and enters the recovery apparatus for pyrolysis oil through the oil discharge outlet by its own gravity. The rest of the pyrolysis gas is sent into the recovery apparatus for pyrolysis gas. After heat exchange, the temperature of the water in the heat exchanger A increases, and the hot water is sent into the hot water inlet of the heat exchanger B through the hot water outlet.

(III) Combustion stage: When the pyrolysis reaction is over, close the valve of the pyrolysis gas outlet of the time sharing reactor for pyrolysis and combustion, and the temperature of the solid thermal carrier therein decreases, and then fill air into the time sharing reactor for pyrolysis and combustion to combust with the pyrolysis volatility products and the pyrolysis residue left in the reactor. After 2 seconds of the reaction, open the valve of the flue gas outlet. The heat produced during the combustion reaction heats the solid thermal carrier in the form of multi-phase heat transfer, and the heated solid thermal carrier is left in the time sharing reactor for pyrolysis and combustion to provide energy for the next round of organic materials pyrolysis. The flue gas is sent into the condenser B to exchange heat indirectly with the condensed water in the heat exchanger B. After being cooled below 120-200° C., the flue gas is sent into the dust remover. The dust-removed flue gas then enters the deacidification system for the removal of the acid gas. The above treatment brings the quality of the flue gas to standard and then the flue gas is released into air. After the heat exchange, the water in the heat exchanger B becomes high-temperature saturated water or steam which is then sent into the high temperature working medium inlet of the water jacket of the high viscosity organic materials feeder to provide new high temperature working medium for heat exchange.

(IV) Alternating and circulating stage: When the combustion reaction is over, close the valve of the flue gas outlet of the time sharing reactor for pyrolysis and combustion. Again the low viscosity organic materials or high viscosity organic materials are sent into the time sharing reactor for pyrolysis process. When the pyrolysis is over, the combustion process is then carried out. The process is thus repeated.

Said self-powered time sharing reaction method for organic materials pyrolysis and combustion adjusts the output rate of the pyrolysis oil and the pyrolysis gas in the pyrolysis volatility products by using catalysts such as precious metal, metal composite oxide, perovskite and spinel.

Advantages of the Invention:

(1) By utilizing the occurrence mode and the migration and transformation rules of organic sulfur, pyritic sulfur and fuel nitrogen in the pyrolysis process, the invention realizes the sulfur removal from the organic sulfur in organic materials and the sulfur removal from pyritic sulfur in the form of H2S, meanwhile, it realizes the release of the fuel nitrogen in organic materials in the form of N2, and the tail gas doesn't need NOX removal process.

(2) By the combining the processes of pyrolysis and combustion, and under the condition of adding a solid thermal carrier, the invention realizes energy self-hold in the whole process and the recycling of the pyrolysis oil and pyrolysis gas therein.

(3) By utilizing a movable and integrated system, the invention realizes the rapid recycling of the internal energy in distributed organic materials, and meanwhile, it saves a large amount of investment and land.

DESCRIPTION OF THE DRAWINGS

FIG. 1 is a schematic diagram of the whole system of the present invention.

FIG. 2 is a schematic diagram of the structure of the container A when the time sharing reactor for pyrolysis and combustion of the present invention is in the form of the rotary kiln type.

In the figures: 1 feeder; 2 time sharing reactor for pyrolysis and combustion; 3 recovery apparatus for pyrolysis volatility products; 4 flue gas purifier; 5 container A; 6 container B; 7 low viscosity organic materials feeder; 8 high viscosity organic materials feeder; 9 driving gear conveyor; 10 driven roller stabilizer; 11 support apparatus; 12 condenser A; 13 recovery apparatus for pyrolysis oil; 14 recovery apparatus for pyrolysis gas; 15 condenser B; 16 dust remover; 17 deacidification system; 18 sealed valve A; 19 sealed valve B; 20 low viscosity organic materials bin; 21 shredder; 22 screw feeder; 23 sealed valve C; 24 high viscosity organic materials bin; 25 water jacket; 26 push-type injection feeder; 27 gas-lock device; 28 fixed overflow baffle; 29 solid thermal carrier; 30 inner air duct; 31 exterior air duct; 32 outer surface gear; 33 movable overflow baffle; 34 slag bin; 35 pyrolysis volatility products outlet; 36 flue gas outlet; 37 air valve; 38 blower; 39 pyrolysis volatility products inlet; 40 pyrolysis gas outlet; 41 cooling water inlet; 42 hot water outlet; 43 oil discharge outlet; 44 flue gas inlet; 45 condensed flue gas outlet; 46 hot water inlet; high temperature working medium outlet; 48 temperature baffles; 49 dust-removed flue gas outlet; 50 deacidified flue gas outlet; 51 neutral waste liquid outlet; 52 high temperature working medium inlet; 53 cooling water outlet; 54 small ash removal door; 55 make-up water inlet; 56 heat exchanger A; 57 heat exchanger B

DETAILED DESCRIPTION

The following figures give further description of specific ways of the implementation of this invention, and in the figures, the time sharing reactor for pyrolysis and combustion is in the form of a rotary kiln.

Figure 3:
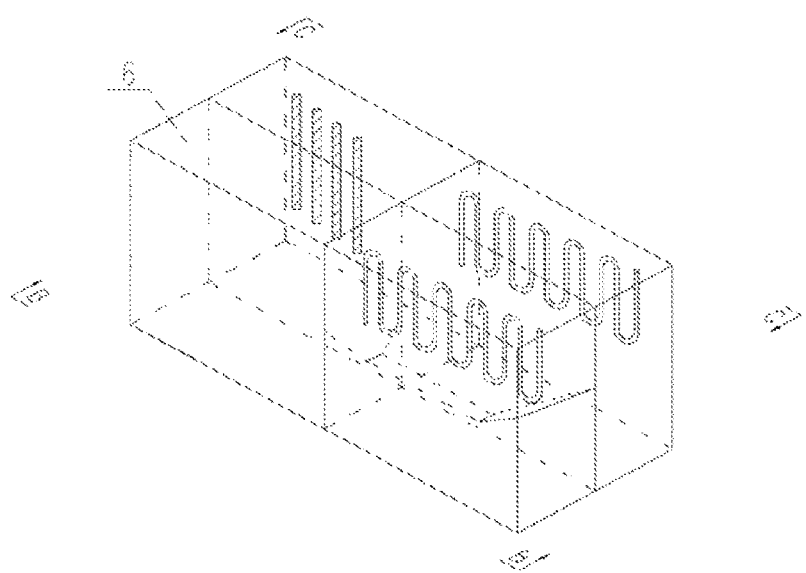
FIG. 3 is a schematic diagram of the structure of the container B when the time sharing reactor for pyrolysis and combustion of the present invention is in the form of the rotary kiln type.
Figure 4:
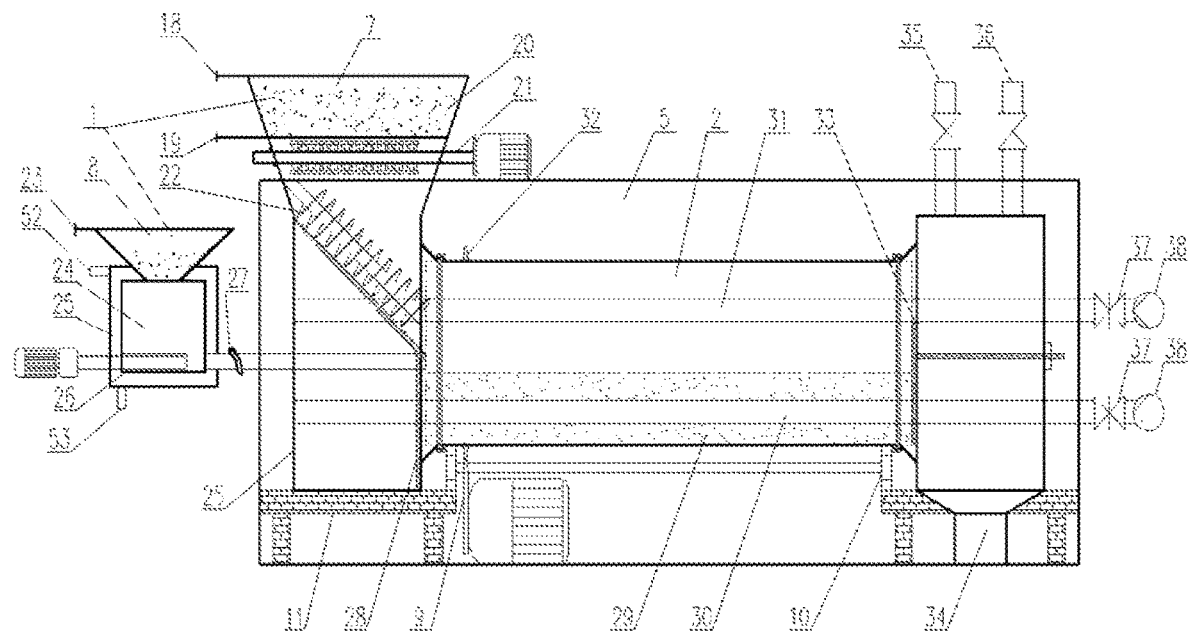
FIG. 4 is an A-A cross-sectional view of the container A when the time sharing reactor for pyrolysis and combustion of the present invention is in the form of the rotary kiln type.
Figure 5:
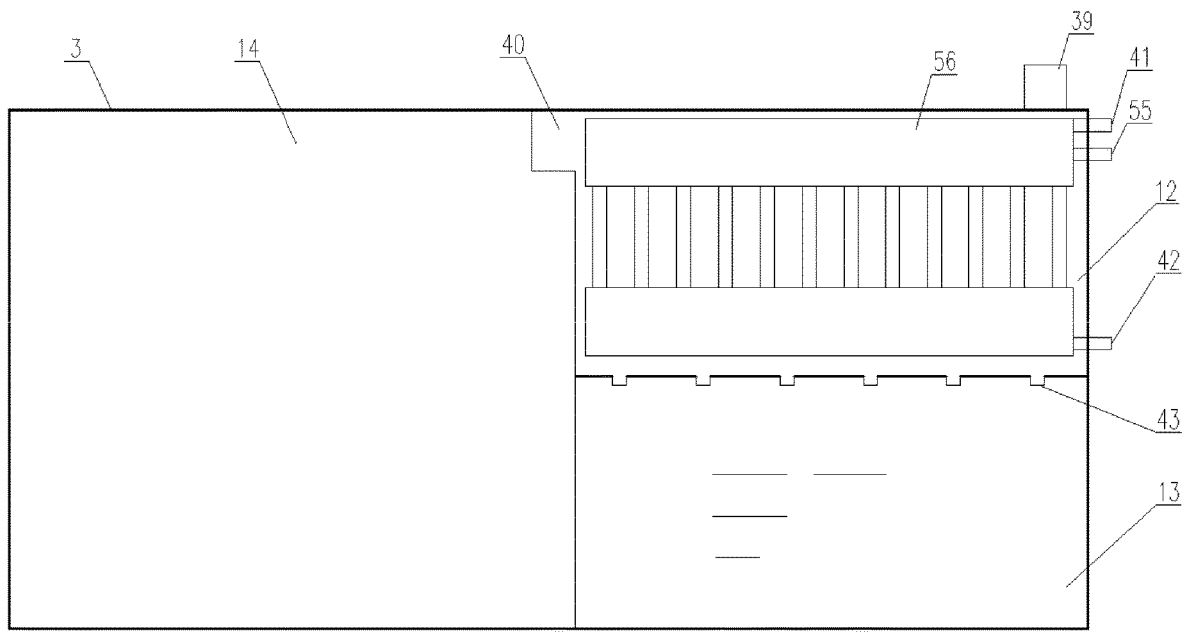
FIG. 5 is a B-B cross-sectional view of the container B when the time sharing reactor for pyrolysis and combustion of the present invention is in the form of the rotary kiln type.
Figure 6:
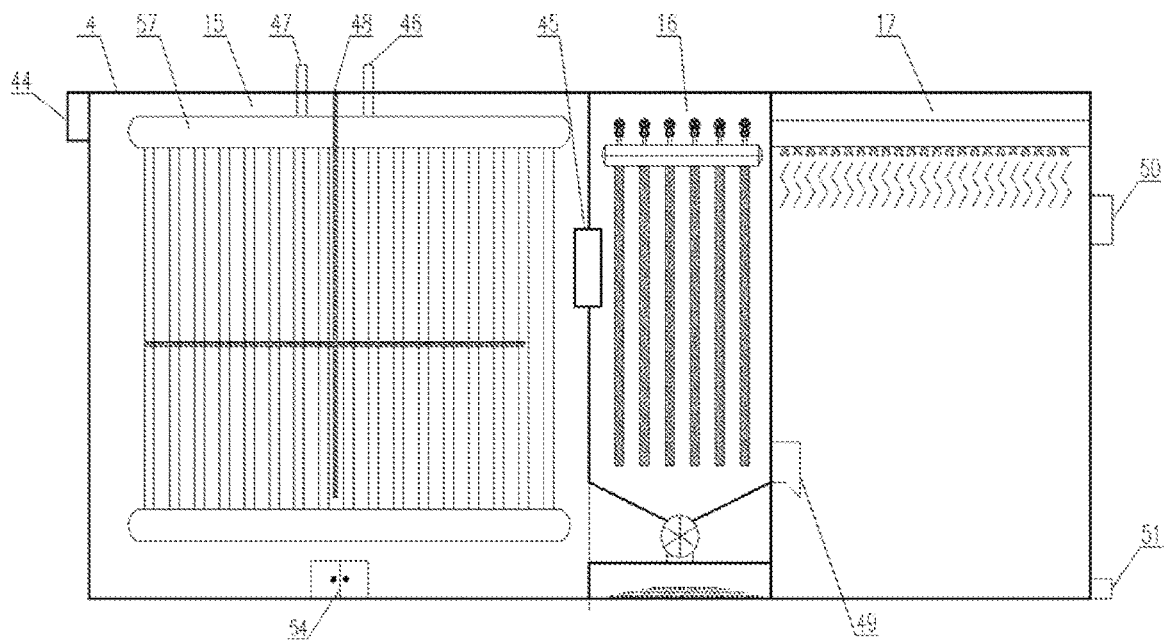
FIG. 6 is a C-C cross-sectional view of the container B when the time sharing reactor for pyrolysis and combustion of the present invention is in the form the rotary kiln type.

According to FIG. 1-FIG. 6, the container A5 comprises a time sharing reactor for pyrolysis and combustion 2 and its corollary apparatus, and the corollary apparatus of the time sharing reactor for pyrolysis and combustion 2 comprises feeder 1 on the top and a driving gear conveyor 9, a driven roller stabilizer 10 and a support apparatus 11 at the bottom. Container B comprises a recovery apparatus for pyrolysis volatility products 3 and a flue gas purifier 4. Before the system starts working, auxiliary fuel is firstly used to preheat the solid thermal carrier 29 in the time sharing reactor for pyrolysis and combustion 2 to 500-1100° C. and then the organic materials are sent into the reactor. The driving gear conveyor 9 drives the time sharing reactor for pyrolysis and combustion 2 by the rotation of outer surface gear 32 at a low speed, meanwhile, the driven roller stabilizer 10 supports the time sharing reactor for pyrolysis and combustion 2 to ensure its smooth rotation. A fixed overflow baffle 28 prevents the solid thermal carrier and the organic materials from dropping off. During the rotation of the time sharing reactor for pyrolysis and combustion 2, the organic materials and the solid thermal carrier 29 therein mix fully and evenly and the pyrolysis reaction takes place rapidly. During the pyrolysis reaction the pyrolysis volatility products and the pyrolysis residue are produced. The heavy tar of the pyrolysis volatility products is condensed and absorbed in the reactor and the rest of the pyrolysis volatility products are sent into the condenser A12 through the pyrolysis volatility products outlet 35. The condenser A12 comprises a heat exchanger A56 inside. The pyrolysis volatility products flow outside the heat exchanger A56 and the condensed water flows inside the heat exchanger A56. Through the form of indirect heat exchange, the condensed water rapidly cool the pyrolysis volatility products below 80° C., and the pyrolysis oil in the pyrolysis volatility products is condensed and liquefied into droplets and then sent into the recovery apparatus for pyrolysis oil 13 by its own gravity. The left pyrolysis gas is sent into the recovery apparatus for pyrolysis gas 14. Throughout the pyrolysis process, the side valve of the flue gas outlet 36 of the time sharing reactor for pyrolysis and combustion 2 is kept closed. When the pyrolysis reaction is over, the side valve of the pyrolysis volatility products outlet 35 is closed, and the air valve 37 and the blower 38 which are on the right of the inner air duct 30 and the exterior air duct 31 are both opened. The air enters the time sharing reactor for pyrolysis and combustion 2 through the pore channel on the tube wall of the inner air duct 30 and the exterior air duct 31, and then the air combusts with the pyrolysis volatility products and the pyrolysis residue left in the time sharing reactor for pyrolysis and combustion 2. After 2 seconds of the reaction, the flue gas outlet 36 opens, and the heat produced during the combustion reaction rapidly heats the solid thermal carrier 29 to 500-1100° C. in a form of multi-phase heat transfer. After the heat exchange the flue gas is sent into the condenser B15. The condenser B15 comprises a heat exchanger B57 inside. The water flows inside the heat exchanger B57 and the flue gas flows outside the heat exchanger B57. Through indirect heat exchange, the flue gas is cooled below 120-200° C. and sent into the dust remover 16. The dust-removed flue gas is then sent into the deacidification system 17 through the dust-removed flue gas outlet 49 to remove the acid gas such as SO2. When the quality of the flue gas meets standard with the treatment, the flue gas is then released into air through the deacidified flue gas outlet 50. The removed acid gas is released in the form of neutral waste liquid through the neutral waste liquid outlet 51. After the heat exchange, the water in the heat exchanger B57 becomes the high-temperature saturated water/steam, and the high-temperature saturated water/steam is then sent into the high temperature working medium inlet 52 of the water jacket 25 through the high temperature working medium outlet 47 to provide new high temperature working medium for heat exchange. During the combustion, the movable overflow baffle 33 gradually moves to the right to ensure that the slag produced in the combustion process is discharged into the slag bin 34 and recycled for manufacturing glass-ceramics. When the combustion reaction is over, the movable overflow baffle 33 moves to the leftmost end of the slide way and the valve of the flue gas outlet 36 closes, and again the low viscosity organic materials/high viscosity organic materials are sent into the time sharing reactor for pyrolysis and combustion 2 to pyrolyse first. When the pyrolysis is over, the combustion process is carried out. The process is thus repeated.

The above description is only one of the embodiments of the time sharing reaction system and method for pyrolysis and combustion. It should be noted that ordinary technicians in this field can also make replacement by other types of reactors without departing from the technical principles of the present invention. These substitutions should also be considered in the protective scope of the present invention.

The materials used in the time sharing reaction system for organic materials pyrolysis and combustion have a wide range of choices, such as biomass, fossil fuels, etc. The system particularly has good treatment effects on the materials which are currently difficult to treat such as low-rank coal, domestic waste and oily sludge.

We claim:

1. A simultaneous reaction system for organic material pyrolysis and combustion comprises a feeder, a time sharing reactor for pyrolysis and combustion, a recovery apparatus for pyrolysis volatility products and a flue gas purifier;
the feeder comprises a low viscosity organic material feeder and a high viscosity organic material feeder;
there are two time sharing reaction stages of pyrolysis and combustion in the time sharing reactor for pyrolysis and combustion; the time sharing reactor for pyrolysis and combustion comprises a solid thermal carrier, the solid thermal carrier comprises an inner air duct inside and an exterior air duct outside, and both the inner air duct and the exterior air duct have holes or wind caps; the inner air duct is used to provide air for burning the pyrolysis residue and the exterior air duct is used to provide air for burning the pyrolysis volatility products;
a pyrolysis volatility products outlet of the time sharing reactor for pyrolysis and combustion connects with a pyrolysis volatility products inlet on a condenser A of the recovery apparatus for pyrolysis volatility products (3), and the pyrolysis volatility products that enter the condenser A exchange heat indirectly with water in a heat exchanger A;
a flue gas outlet of the time sharing reactor for pyrolysis and combustion connects with a flue gas inlet on a condenser B of the flue gas purifier, and the flue gas from the time sharing reactor for pyrolysis and combustion exchanges heat indirectly with steam/water in a heat exchanger B.

2. The simultaneous reaction system for organic material pyrolysis and combustion according to claim 1, wherein the low viscosity organic material feeder comprises a sealed valve A, a sealed valve B, a low viscosity organic material bin, a shredder and a screw feeder; the sealed valve A is set at the inlet of the low viscosity organic material bin and a material outlet of the low viscosity organic material bin connects with the inlet of the shredder through the sealed valve B; the outlet of the shredder connects with the inlet of the screw feeder; the outlet of the screw feeder leads to the time sharing reactor for pyrolysis and combustion; wherein the low viscosity organic material passes sequentially through the low viscosity organic material bin, the shredder and the screw feeder and finally enter the time sharing reactor for pyrolysis and combustion.

3. The simultaneous reaction system for organic material pyrolysis and combustion according to claim 1, wherein the high viscosity organic material feeder comprises a sealed valve C, a high viscosity organic material bin, a water jacket, a push-type injection feeder and a gas-lock device; the sealed valve C is set on the top of the high viscosity organic material bin, and the outlet of the high viscosity organic material bin connects with a material inlet of the time sharing reactor for pyrolysis and combustion through the gas-lock device; wherein the push-type injection feeder is set at the bottom of the high viscosity organic material bin and in front of the gas-lock device; and used to jet the high viscosity organic material into the time sharing reactor for pyrolysis and combustion, which prevents the high viscosity organic material in the time sharing reactor for pyrolysis and combustion from accumulating; the water jacket, 30-50 mm thick, is set outside the high viscosity organic material bin.

4. The simultaneous reaction system for organic material pyrolysis and combustion according to claim 3, wherein the recovery apparatus for pyrolysis volatility products comprises the condenser A, a recovery apparatus for pyrolysis oil and a recovery apparatus for pyrolysis gas; the condenser A has the heat exchanger A inside and there is an oil discharge outlet at the bottom of the condenser A; the oil discharge outlet leads to the recovery apparatus for pyrolysis oil below the condenser A; the condensed pyrolysis oil passes the oil discharge outlet and enters the recovery apparatus for pyrolysis oil for recovery; the recovery apparatus for pyrolysis gas is set on the left of the condenser A and a gas passage is between them; the pyrolysis gas released from the outlet of the condenser A enters the recovery apparatus for pyrolysis gas for recovery.

5. The simultaneous reaction system for organic material pyrolysis and combustion according to claim 1, wherein the flue gas purifier comprises the condenser B, a dust remover, a deacidification system; the dust remover and the deacidification system are sequentially placed on the right of the condenser B; the condenser B has the heat exchanger B inside; a condensed flue gas outlet of the condenser B leads to the dust remover; a dust-removed flue gas outlet of the dust remover leads to the deacidification system; when the processes of dust removal and deacidification bring the quality of the flue gas to the standard, the processed flue gas is then released directly into air; there is a small ash removal door at the bottom of the condenser B; said dust remover can be a bag type, a ceramic type or an electrostatic type; the dust removal efficiency should be more than 99.9%.

6. The simultaneous reaction system for organic material pyrolysis and combustion according to claim 5, wherein a water jacket of the high viscosity organic material feeder comprises a high temperature working medium inlet and a cooling water outlet; the cooling water outlet connects with a cooling water inlet of the condenser A; the cooling water becomes hot water after the indirect heat exchange with the pyrolysis volatility products in the condenser A; the condenser A comprises a hot water outlet, and the hot water outlet connects with a hot water inlet of the condenser B; the heated water enters the condenser B to exchange heat indirectly with the flue gas and becomes high-temperature saturated water or steam; the condenser B comprises a high temperature working medium outlet which connects with the high temperature working medium inlet of the water jacket; after the heat exchange the high-temperature saturated water or steam passes the duct and the high temperature working medium inlet and enters the water jacket; the process is thus repeated.

7. The simultaneous reaction system for organic material pyrolysis and combustion according to claim 1, wherein the condenser A also comprises a make-up water inlet; if there is water loss during the whole pyrolysis and combustion process, additional water will be fed into the heat exchanger A for supplement through the make-up water inlet of the condenser A.

8. The simultaneous reaction system for organic material pyrolysis and combustion according to claim 7, wherein plurality of transverse and longitudinal temperature baffles are set inside said condenser B to enhance the heat exchange and increase the overall retention time of flue gas at the same time.

9. The simultaneous system for organic material pyrolysis and combustion according to claim 1, wherein the simultaneous reaction system for organic material pyrolysis and combustion can be manufactured into a movable type; the time sharing reactor for pyrolysis and combustion and its corollary apparatus are placed in container A, and the recovery apparatus for pyrolysis volatility products and the flue gas purifier are placed in container B; the time sharing reactor for pyrolysis and combustion can be in a form of rotary kiln which can realize full mixture of the solid thermal carrier and the organic material by self-rotation of the rotary kiln; it can also be in a form of fixed bed which can realize full mixture of the solid thermal carrier and the organic material by adding an agitator; or it can be in a form of fluidized bed which can realize full mixture of the solid thermal carrier and the organic material by bed fluidization; if the time sharing reactor for pyrolysis and combustion is in the form of fluidized bed, the inner air duct is equivalent to an air distributor.

10. A simultaneous reaction method for organic material pyrolysis and combustion, wherein a solid thermal carrier is used as a heat-transfer medium, and pyrolysis and combustion are carried out in the same time sharing reactor; the method comprises the following steps:
(I) feeding stage: open a sealed valve A and close a sealed valve B; a low viscosity organic material is sent into a low viscosity organic material bin through the sealed valve A on the top of a low viscosity organic material feeder; when the amount of the low viscosity organic material reaches a given quantity, close the sealed valve A, open the sealed valve B and operate the shredder; the low viscosity organic material is crushed into pieces of 1-5 mm, and then sent into the time sharing reactor for pyrolysis and combustion through the screw feeder;
open the sealed valve C and the high viscosity organic material is sent into the high viscosity organic material bin through the sealed valve C; when the amount of the high viscosity organic material reaches a given quantity, close the sealed valve C; the high viscosity organic material in the high viscosity organic material bin is melted by the high-temperature saturated water/steam inside the water jacket and then jetted into the time sharing reactor for pyrolysis and combustion by the push-type injection feeder;
(II) pyrolysis stage: close the valve of the flue gas outlet of the time sharing reactor for pyrolysis and combustion and the organic material that is sent into the time sharing reactor for pyrolysis and combustion mix fully and evenly with the solid thermal carrier; the solid thermal carrier rapidly heats the organic material and the pyrolysis reaction takes place, which produces the pyrolysis residue and the pyrolysis volatility products; open the pyrolysis volatility products outlet; the heavy tar in the pyrolysis volatility products is condensed and absorbed in the reactor, most of the pyrolysis volatility products are sent into the condenser A of the recovery apparatus for pyrolysis volatility products, and the pyrolysis residue and a small amount of the pyrolysis volatility products are left in the time sharing reactor for pyrolysis and combustion; the pyrolysis volatility products exchanges heat indirectly with the condensed water in the condenser A; the pyrolysis oil in the pyrolysis volatility products is condensed and liquefied into droplets and enters the recovery apparatus for pyrolysis oil through the oil discharge outlet; the rest of the pyrolysis gas is sent into the recovery apparatus for pyrolysis gas; after the heat exchange, temperature of the water in the heat exchanger A increases, and the hot water is sent into the hot water inlet of the heat exchanger B through the hot water outlet;
(III) combustion stage: when the pyrolysis reaction is over, close the valve of the pyrolysis gas outlet of the time sharing reactor for pyrolysis and combustion, and the temperature of the solid thermal carrier therein decreases, and fill air into the time sharing reactor for pyrolysis and combustion to combust with pyrolysis volatility products and the pyrolysis residue left in the reactor; after 2 seconds of reaction, open the valve of the flue gas outlet; the heat produced during combustion heats the solid thermal carrier in a form of multiphase heat transfer, and the heated solid thermal carrier is left in the time sharing reactor for pyrolysis and combustion to provide energy for the next round of organic material pyrolysis; the flue gas is sent into the condenser B and exchanges heat indirectly with the hot water in the heat exchanger B; after being cooled below 120-200° C., the flue gas is sent into the dust remover; the dust-removed flue gas then enters the deacidification system for the removal of the acid gas; the above treatment brings the quality of the flue gas to standard and then the flue gas is released into air; after the heat exchange, the water in the heat exchanger B becomes high-temperature saturated water or steam which is then sent into the high temperature working medium inlet of the water jacket of the high viscosity organic material feeder to provide new high temperature working medium for heat exchange;
(IV) alternating and circulating stage: when the combustion reaction is over, close the valve of the flue gas outlet of the time sharing reactor for pyrolysis and combustion; the low viscosity organic material or high viscosity organic material are again sent into the time sharing reactor for pyrolysis and combustion for pyrolysis process; when the pyrolysis is over, the combustion process is carried out; the process is thus repeated;—the whole process adjusts the output rate of the pyrolysis oil and the pyrolysis gas in the pyrolysis volatility products by using catalysts such as precious metal, metal composite oxide, perovskite and spinel.

* * * * *